Sept. 27, 1932. L. W. CLAYBOURN 1,879,095
SHEET DELIVERY CONTROL
Filed Oct. 25, 1929 2 Sheets-Sheet 1
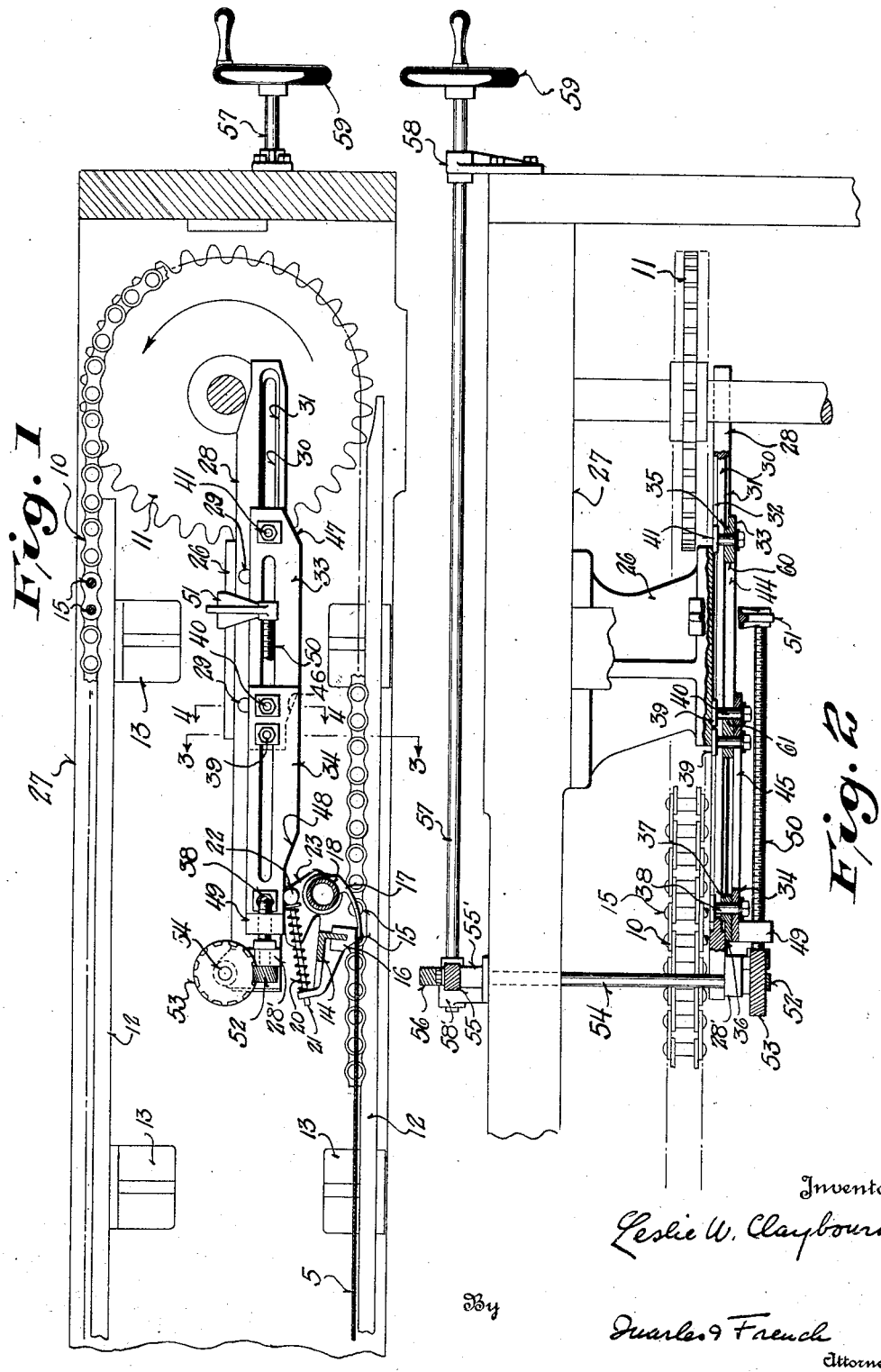
Inventor
Leslie W. Claybourn
By
Quarles & French
Attorneys Sept. 27, 1932.   L. W. CLAYBOURN   1,879,095
SHEET DELIVERY CONTROL
Filed Oct. 25, 1929   2 Sheets-Sheet 2
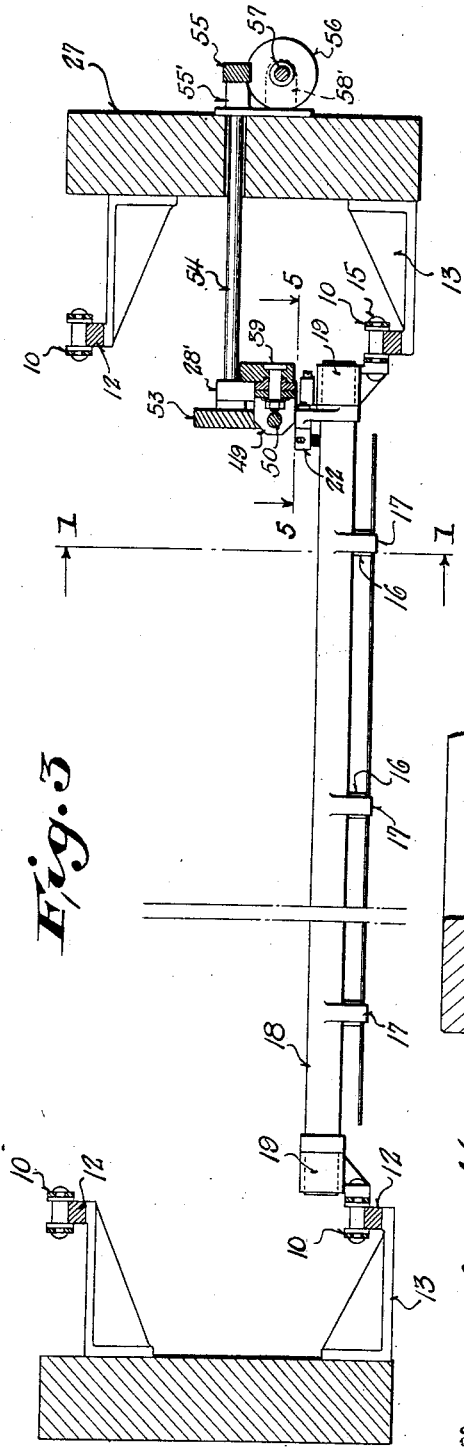
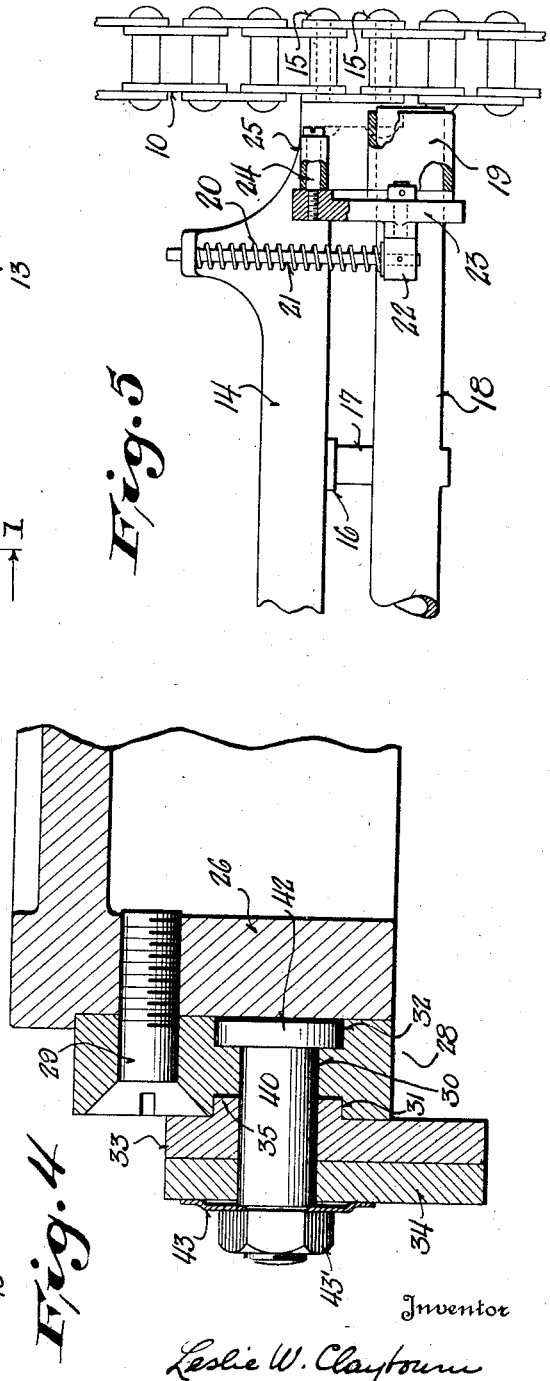
Inventor
Leslie W. Claybourn
By Quarles & French
Attorneys Patented Sept. 27, 1932

1,879,095

UNITED STATES PATENT OFFICE

LESLIE W. CLAYBOURN, OF MILWAUKEE, WISCONSIN, ASSIGNOR TO CLAYBOURN PROCESS CORPORATION, OF MILWAUKEE, WISCONSIN, A CORPORATION OF WISCONSIN

SHEET DELIVERY CONTROL

Application filed October 25, 1929. Serial No. 402,430.

The invention relates to gripper release mechanism for printing presses or other paper-sheet-handling machinery.

Heretofore, so far as I am aware, it has always been necessary to stop the sheet delivery mechanism in order to adjust the release of the sheet grippers, which involves loss of time. One of the objects of the present invention is to provide gripper release mechanism that may be adjusted while the press or other machinery in connection with which the grippers are associated is in motion.

A further object of the invention is to provide a gripper release mechanism embodying a two-part cam, the parts of said cam being adjustable relative to each other to vary the length of time the grippers are open, the parts of said cam being also adjustable together to vary the time of opening and closing of the jaws, whereby the control of the grippers may be efficiently effected to accommodate the speed of the press and the weight of the sheet.

A further object of the invention is to provide a gripper release control mechanism mounted on the outside of the sheet-handling mechanism where it is readily accessible and visible to the operator so that the adjustments theretofore mentioned may be readily made.

The invention further consists in the several features hereinafter described and more particularly defined by claims at the conclusion hereof.

In the drawings Fig. 1 is a detail sectional view taken on the line —1— of Fig. 3;

Fig. 2 is a detail plan view of mechanism embodying the invention, parts being broken away and parts being shown in section;

Fig. 3 is a transverse sectional view taken on the line 3—3 of Fig. 1;

Fig. 4 is a detail sectional view taken on the line 4—4 of Fig. 1;

Fig. 5 is a detail sectional view taken on the line 5—5 of Fig. 3, parts being broken away and parts being shown in section.

The invention has been shown associated with a sheet-gripping-and-conveying mechanism of known construction, wherein the endless conveyor in the form of spaced chains 10 running over sprockets 11 (one of which is shown), and whose upper and lower runs ride on the spaced tracks or supports 12 carried by the frame 13 of the machine, is provided at spaced intervals with gripper mechanism.

As herein shown, each gripper comprises a transverse frame member 14 secured to the chains 10 by connection with two of the pintles 15 thereof, said frame member carrying fixed gripper fingers 16 which cooperate with the pivotally movable gripper fingers 17, each of which is mounted on a transversely extending tubular shaft 18 which is pivotally mounted at its ends in bearings 19 mounted on the associated frame member 14. The fingers 17 are normally moved to a closed position by a spring 20 loosely mounted on a guide rod 21 carried by a pin 22 on a lever arm 23 secured to the tubular shaft 18 and slidably mounted in a guide opening in the member 14, said spring being interposed between the member 14 and said pin 22 and thereby exerting pressure on the arm 23 to turn the shaft 18 and thus move said fingers 17 to closed position to hold the sheet 5.

The lever arm 23 also carries a stud shaft 24 on which a roller 25 is mounted, which roller is adapted to engage the gripper release mechanism hereinafter described.

A supporting bracket or frame member 26 is secured to the side frame member 27 of the delivery mechanism and a cam guide and supporting member 28 is secured thereto by screws 29, said member having a longitudinally extending slot 30 and guide recesses 31 and 32 formed therein on opposite sides of said slot.

A pair of cam members 33 and 34 are adjustably, slidably supported on the member 28 and mounted thereon for adjustment relative to each other.

The cam member 33 has square bosses 35 slidably mounted and guided in the recess 31. The cam member 34 is mounted to slide on the front face of the cam member 33 and at its forward end has a block 36 secured to it and provided with a boss 37 slidably mounted and guided in the recess 31 and acting to space this end of the cam from the member 28 to a distance corresponding to the thickness of the cam 33.

The cam members 33 and 34 are releasably held together and to the support by studs 38, 39, 40 and 41, having heads 42 slidably guided in the recesses 32 and shanks projecting through the slot 30 in the member 28, said studs being yieldingly clamped to the cam or cam members with which they are associated by a spring plate 43 held against the adjacent cam member by the nut 43'.

The studs 38 and 40 have their shanks passing through openings in the cam member 34 and normally hold this member against movement relative to the support 28 and the member 33.

The studs 39 and 41 have their shanks passing through openings in the cam member 33 and normally hold this member against movement relative to the support 28 and the member 34.

To provide for relative movement of said cam members, the member 33 has a longitudinally extending slot 44 through which the stud 40 projects and the member 34 has a longitudinally extending slot 45 through which the stud 39 projects.

The cam member 33 has the front bevelled face 46 and the rear bevelled face 47, while the cam member 34 has the front bevelled face 48.

The adjustment of the cam members 33 and 34 relative to each other is accomplished by means for moving one cam through the other cam. As herein shown, the cam member 34 has a laterally projecting boss 49 threaded to receive a screw shaft 50 which is journalled at one end in an overhanging supporting arm 51 on the frame member 26 and at its other end in a bearing 28' on the supporting member 28. Turning this screw shaft 50 will cause the member 34 to be moved longitudinally relative to the member 28 and with or relative to the cam 33, and may be done while the machine is in operation.

For turning the shaft 50 the same is provided with a skew gear 52 meshing with a similar gear 53 on a shaft 54 disposed at right angles thereto and between the upper and lower runs of the conveyor, said shaft 54 being journalled at its inner end in a bearing on the member 28' and at its outer end in a bearing bracket 55' secured to the frame 13, said shaft having a skew gear 55 mounted thereon, at the side of the machine, meshing with a skew gear 56 on an operating shaft 57 journalled in bearing brackets 58 and 58' and carrying a handwheel 59. Thus, turning the wheel 59 will turn the shaft 57 and, through the gear above described, the shafts 54 and 50.

When the shaft 50 is turned to move the cam 34 to the right said cam moves independently of the cam 33 until the stud 40 engages the end 60 of the slot 44 and then both cams move together. When the shaft 50 is turned in the opposite direction the cam 34 is moved toward the left and independently of the cam member 35 while the stud 40 is moving in the slot 44 until said stud engages the end 61 of the slot 44 and then both cams move together. In this manner the position of the cam face 48 that acts on the roller 25 to open the gripping members is adjusted and the position of the cam face 47 that acts on the roller 25 to permit the grippers to close is adjusted, it being noted that when said cams are in the position shown in Fig. 1 they provide the longest time interval during which the jaws of the grippers are open and that as said cams are moved inwardly relative to each other this time interval is shortened. It will also be noted that the cam members may be shifted together to different positions along the member 28 to accommodate different sized sheets.

Thus the time at which the grippers are opened and the duration of opening may be readily adjusted to suit the speed of the machine and the weight and size of the sheet being handled and the adjustment may be made while the machine is in operation. Furthermore, the mechanism above described is readily visible to an operator looking down upon the delivery mechanism from a position adjacent the handwheel 59.

I desire it to be understood that this invention is not to be limited to any particular form or arrangement of parts except insofar as such limitations are specified in the claims.

What I claim as my invention is:

1. In sheet-delivery mechanism, the combination with the sheet-gripper mechanism, of cam control means for said gripper mechanism, and means for adjusting said cam control means while the delivery mechanism is in operation.

2. In sheet-delivery mechanism, the combination with the main frame and the sheet gripper mechanism including a pivoted gripper member, of adjustable means controlling the opening and closing movement of said member mounted adjacent the side of the machine, and manually-operated means, exterior of said delivery mechanism and said main frame, connected with said first-named means for effecting the adjustment of said adjustable means.

3. In sheet-delivery mechanism, the combination with the sheet-gripper mechanism including a relatively fixed sheet-gripper member and a movable sheet-gripper member, means for urging said movable gripper member to sheet-holding position, and control means for said movable gripper member comprising a cam including parts adjustable together relative to said gripper member and adjustable relative to each other to vary the time of opening and the duration of opening of said movable gripper member.

4. In sheet-delivery mechanism, the combination with the sheet-gripper mechanism including a relatively fixed sheet-gripper member and a movable sheet-gripper member, means for urging said movable gripper member to sheet-holding position, control means for said movable gripper member comprising a movable cam including relatively slidably movable parts for varying the time of and the duration of opening period of said movable gripper member, and means for adjusting said parts while the delivery mechanism is in operation.

5. In sheet-delivery mechanism, the combination with the travelling sheet-gripper mechanism including a relatively fixed sheet gripper member and a movable sheet gripper member, means for urging said movable gripper member to sheet-holding position, control means for said movable gripper member comprising a cam including parts slidably mounted relative to each other, a fixed support upon which said cam parts are also slidably mounted and supported, and means for moving one cam part to adjust the position of both cam parts for the desired time of opening and duration of opening interval of said movable sheet-gripper member.

6. In sheet-delivery mechanism, the combination with the spring-closed travelling sheet-gripper mechanism, of a slotted support, a pair of gripper control cam members arranged adjacent each other and provided with longitudinally extending slots, studs for slidably securing said cam members to each other and to said support, said studs passing through the slotted portion of said support and some of the studs passing through the slots in said cam members whereby one cam member is moved by the other.

7. In sheet-delivery mechanism, the combination with the spring-closed, travelling sheet-gripper mechanism, of cam-release means for said gripper mechanism comprising a plurality of relatively movable cam members, means connecting said cam members together for moving one of said members by the movement of the other member, and means for moving said other member to adjusted position comprising a screw shaft, and operating connections for said shaft extending to an exterior position readily accessible to the operator.

8. In sheet-delivery mechanism, the combination with the spring-closed travelling sheet-gripper mechanism, of cam-release means for said gripper mechanism comprising a plurality of slidable cam members arranged in juxtaposition, means for adjustably connecting said cam members to a fixed support and permitting the movement of one cam member by the other, and means for moving one of said cam members comprising an operating shaft, and manually operated means for turning said shaft including operating connections extending to a position exterior of the delivery mechanism and adjacent one side thereof.

9. In sheet-delivery mechanism, the combination with the main frame and the sheet-gripper mechanism including a relatively fixed sheet-gripper member and a movable sheet-gripper member, of adjustable cam means controlling the opening and closing movement of said movable gripper member, and manually operable control means for said cams, means including a control shaft extending to a position exterior of the delivery mechanism and said main frame at one side thereof and from a position from which said mechanism is readily visible to the operator looking down on said delivery mechanism for adjusting said cam means while the machine is in operation.

10. In sheet-delivery mechanism, the combination with the main frame and the sheet-gripper mechanism including a relatively fixed sheet-gripper member and a movable sheet-gripper member, of cam means comprising a plurality of articulated movable members controlling the opening and closing movement of said movable gripper member, means for moving one of said members to adjust the position of said members for controlling said movable gripper member, and manually operable control means for said cam means including a control shaft extending to a position exterior of the delivery mechanism and said main frame at one side thereof and operable from said exterior position for adjusting said cam means while the machine is in operation.

In testimony whereof, I affix my signature.

LESLIE W. CLAYBOURN.